May 2, 1967
W. J. LIEBIG
3,316,557
SURGICAL, VASCULAR PROSTHESIS FORMED OF COMPOSITE YARNS
CONTAINING BOTH SYNTHETIC AND ANIMAL
DERIVATIVE STRANDS
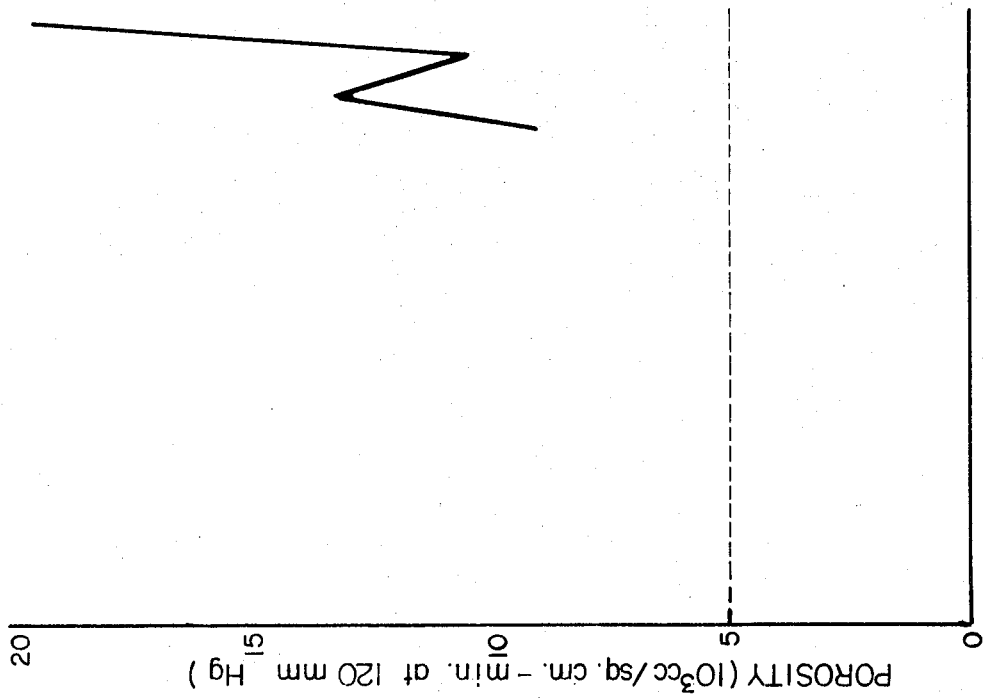
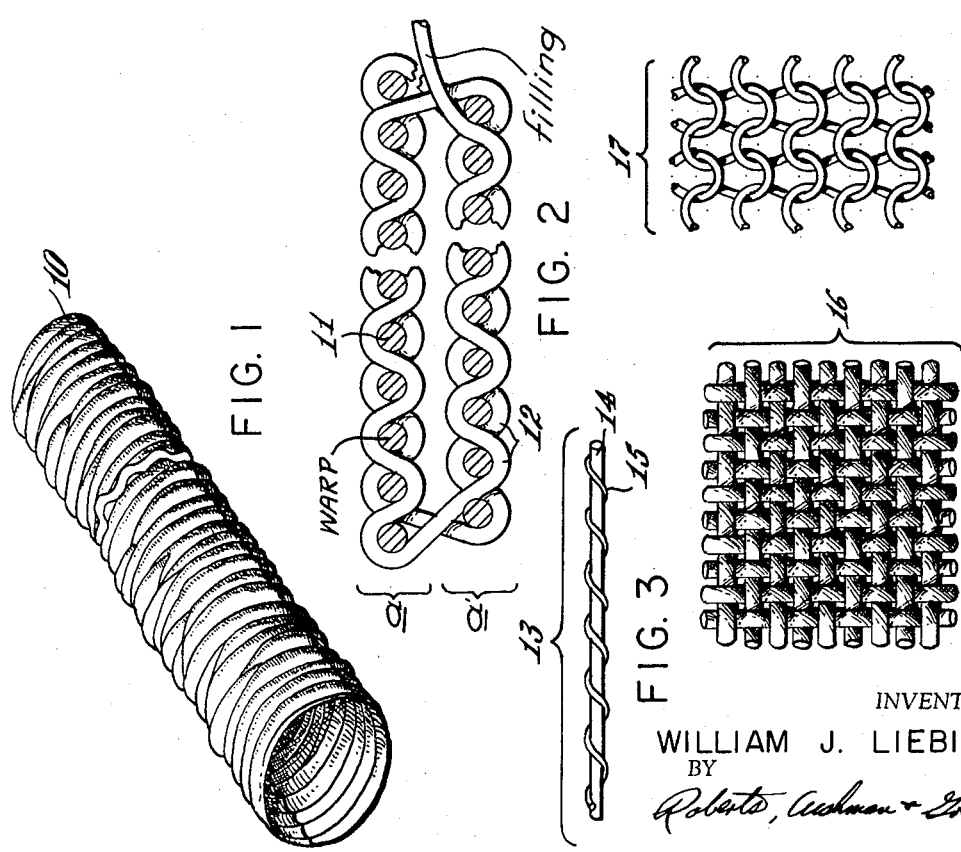
INVENTOR.
WILLIAM J. LIEBIG
BY
Roberts, Cushman & Grover
ATTORNEYS

United States Patent Office 3,316,557
Patented May 2, 1967

3,316,557
SURGICAL, VASCULAR PROSTHESIS FORMED OF COMPOSITE YARNS CONTAINING BOTH SYNTHETIC AND ANIMAL DERIVATIVE STRANDS
William J. Liebig, Harrington Park, N.J., assignor to Meadox Medicals, Incorporated, Haledon, N.J., a corporation of New Jersey
Filed Feb. 15, 1965, Ser. No. 432,700
9 Claims. (Cl. 3—1)

This application is a continuation-in-part of my copending application, Ser. No. 144,811, filed Oct. 9, 1961, and now abandoned which copending application is in turn a continuation-in-part of my parent application, Ser. No. 126,753, filed June 6, 1961, and now abandoned.

The present invention relates to prosthetic devices, vascular implants and the like for surgical use in the repair and replacement of vessels and tracts in human and animal bodies, such means for example as are the subject of my Patent No. 2,978,787 of Apr. 11, 1961, and as to which the present invention constitutes an improvement.

In the practice of vascular surgery such defects in the vascular system as aneurysms or occlusions are corrected by the technique of suture anastomosis, by which the area or segment of pathology is excised or resected, and replaced by a prosthetic device, or graft, which is implanted, or sutured in. The vascular prosthetic grafts are employed in various sizes and in all parts of the vascular system, and comprise straight or variously branched tubes of flexible, porous construction or fabrication from fibers or strands run together or interlaced in an interstitial or mesh structure, as hereinafter to be more fully detailed.

The vascular prosthetic grafts here concerned desirably are non-toxic and non-allergenic; non-deteriorating upon implantation for prolonged periods; and capable of deforming without collapsing and twisting without kinking. Desirably also, the porosity of the grafts on implantation is low enough to permit the implantation without preclotting, and into a heparinized subject with safety.

Ideally, then, the initial porosity of the vascular grafts, or that which they exhibit upon implantation, will approach zero, or imperviousness to the blood, whereby they will contain or prevent any hemorrhage or leakage of the blood at the time when the blood flow is first restored and admitted to the implant.

Under this invention there is also taken into account the long term biological fate of the vascular prosthetic grafts, and more particularly the factors that may limit the healing of the grafts once implanted. The body heals by fibrosis; that is, the organism's reaction to the implantation of the foreign body is to attempt to completely encapsulate the graft with fibrous or scar tissue, forming both an outer layer or capsule of fibrous tissue and an inner capsule of fibrous tissue within the lumen of the graft. The healing process is initiated within hours of implantation by the deposit of a thin fibrous layer or mat on the inside of the graft in contact with the blood stream. The fibrous mat then organizes more slowly, within a period of days to weeks, into a layer of mature scar tissue. The origin of the fibroblasts forming the inner layer or capsule is considered to be migration or growth from the outer capsule through the mesh or interstices of the graft. The fibrous inner layer, then, is dependent for its blood supply and integrity on interstitial tissue in growth, and a principal factor limiting the biological fate of the graft is the ease with which the fibrous tissue may grow through the implant wall. Thus, difficulty in the fibrous tissue infiltration through the mesh, also interference with the viability of the tissue traversing the interstices, may lead to poor organization of the inner capsule, with inability to maintain integrity, and resulting in sloughing and necrosis. Again, whereas the healing process is ideally to produce a permanently thin and viable inner capsule, the shutting off of an adequate blood supply through the interstices of the graft, as may be caused by scar contracture of the encapsulating fibrous tissue, may produce roughness and irregularity in and an excessive thickening of the inner capsule.

Since normal scar tissue becomes avascular and thins out, in acceptable healing process the inner fibrous capsule may thin out without obvious necrosis but with simple chronic atrophy that would not stimulate multiple layer formation.

However, the healing process which has been experienced with the prior grafts has involved the formation of multiple or two or more inner capsule layers within the graft. In this there is observed a degeneration of the intercapsular tufts and the basal inner layer, which occurs secondary to cicatricial maturation, or contracture about the blood vessel ingrowth through the interstices of the mesh. In other words, the compromise of the blood supply to the inner capsule occurring more rapidly than in normal maturation of scar tissue leads to scar tissue necrosis.

There ensues a reorganization of the necrotic fibrous tissue (fibrin) which also takes place through the mesh or interstices of the graft, and with replacement thereby of the initially degenerated thin fiber mat with capillary-bearing granulation tissue and immature fibrous tissue.

A recognized complication of this process is the formation of scar tissue. That is, it is considered that if the porosity of the graft is too low, and the reorganization is significantly delayed, the necrotic fibrous tissue will calcify. In addition, significant degeneration of the fibrous inner capsule may produce gross complications. The deposit of fibrin upon the inner surface of the graft may be attracted or stimulated, secondary to one or more cycles of capsular degeneration, with the formation of diaphragms or septa. Stenosis or occlusion may ultimately develop, as a function of the fibrin septum formation.

Another biological factor which has been related to the graft porosity is the bonding of the outer capsule; the degree of bonding of the outer and inner capsules is correlated with the fibrous tissue ingrowth through the mesh. So that with degeneration of the intercapsular tufts there may occur spontaneous separation of the inner from the outer capsule, leading to hemorrhage and delayed seroma or perigraft hematoma formation.

Yet another biological factor related to the porosity of the graft, or the rate of intercapsular reorganization, is the residual lumen of the graft, upon which depends in turn the propensity of the material to form septa.

The healing process, then, is related to both the initial and the terminal porosity of the graft. Thus while the graft is to be blood tight upon implantation, for best biological healing over the long term it should have the highest possible biological porosity for ingrowth of fibroblasts and maintenance of more or less permanent blood supply, whereby to form a permanently thin, even, and viable inner capsule.

This high healing porosity or fibroblastic permeability is of course incompatible with the desired minimum implantation porosity, in the conventional practice. That is, the vascular prosthetic grafts of the prior art upon which the invention improves are inherently characterized by or limited to an unchanging or a constant porosity. For these grafts the desired minimum initial and maximum final porosities are contradictory or mutually exclusive properties.

The prior grafts are of all-synthetic construction, and the fabricating of these with a sufficiently close mesh to contain the blood against leakage at implantation will at the same time limit the long term or terminal porosity of such grafts to far less than what is found to be ideal for optimum healing results. Late occlusions have in fact been experienced with such all-synthetic grafts.

The present invention aims to provide vascular prostheses which are at once and uniquely characterized by initial porosities which allow their safe implantation and ultimate porosities that afford them good healing qualities.

In accordance with this invention novel prosthetic devices or vascular implants are provided which are distinguished and improved by their fashioning from a material affording the devices a capacity for transformation as between an initial relatively low porosity and a subsequently developed much greater porosity such as to promote encompassing tissue and cellular growth.

A more particular object of this invention is to provide a graft of improved, compound construction, whereby it may be blood tight when implanted, but subsequently will exhibit a very high healing porosity or fibroblastic permeability with minimum impedance to fibroblastic ingrowth.

This invention aims to attain both low initial porosity at implantation and high biological porosity upon healing by a compound graft construction characterized more particularly by a mixture of absorbable and non-absorbable components.

A still further invention object is to provide for prosthetic vascular grafts a compound material in which absorbable yarns are incorporated in a repeating cycle into the pattern of the fabric.

Yet another biological factor taken into account by this invention is the rate of degeneration and reorganization of the scar tissue or fibrous layer. It is found that the tissue replacement and cellular growth proceeds substantially immediately upon graft implantation, and that delayed resorbtion or porosity increase will induce the cyclical degeneration and reorganization, or thickening, of the inner capsule, and increase the likelihood of calcification and septum formation.

Accordingly it is a further object of this invention to provide a compound graft construction in which may be employed an organic or animal derivative component having the capacity to be resorbed substantially within twenty-four hours of the implantation.

Another, related, biological healing factor with which this invention is concerned is foreign body reaction. It is found that the body's reaction to the implantation of the synthetic material is to induce a tissue build up of graft-lumen-limiting proportions, in degree correlated with the amount or proportion of the synthetic component. In other words, the inclusion of the absorbable component, in the compound fabric of the invention, reduces the lumen-limiting tissue growth. Accordingly, this invention aims still further to provide a graft fabrication with the maximum proportion of non-synthetic or animal derivative component that allows a stable residual fabric and with strength to contain blood pressure pulses.

Porosity is herein expressed in terms of passage of water (not air), and as measured on the scale and by the procedure of Wesolowski. In the Wesolowski test the fabric piece is clamped flatwise and subjected to a column of water at a constant pressure head of 120 mm. of mercury, and readings are obtained which express cubic centimeters or millimeters of water permeating per minute through each square centimeter of fabric. The meter scale reads in units expressive of such water porosity ranging from an absolute impermeability value of zero through the smaller increments and upwardly through the range of 1,000, 2,000 etc., to a value of 20,000 equivalent to free flow.

For the above stated capacity of conversion from an initially low to an ultimately high porosity the vascular prosthetic grafts or implants of the invention are fabricated wholly or in part of composite yarns, comprising one or more component strands of synthetic composition which are relatively inert to change in the presence of living tissues and which afford a frame-work or shape-defining structure for the implant, and one or more component strands of an absorbable or resorbable organic protein or animal derivative composition which are sufficiently hemostatic to prevent blood leakage during an initial period of the prosthesis and which are capable of being digested and replaced by invading organic growths in the host patient.

The composite-yarn-containing, part-absorbable grafts of this invention are herein termed "compound" grafts, to conventiently differentiate them from the conventional all-synthetic grafts, which are herein termed "simple" grafts.

In the accompanying drawings illustrating certain embodiments of the invention:

FIG. 1 shows in perspective a relatively short length of a tubular implant after micro-crimping and readied for surgical use;

FIG. 2 is a diagrammatic cross-sectional and enlarged view of one form of woven tubular fabric structure suitable for implant purposes in accordance with the invention;

FIG. 3 shows partly diagrammatically and on an enlarged scale a composite yarn having a resorbable core within a wrap of synthetic composition and useful in fabrics for implants of the invention;

FIG. 4 is an enlarged view of a small area of woven fabric as may be employed in tubular implants of the invention;

FIG. 5 illustrates on a large scale a small area of implant fabric material of a knitted construction; and FIG. 6 is a graphic representation of the digested or long term porosity of the compound grafts of the invention.

As hereinbefore explained it is found that upon the implantation of the prior art vascular prosthetic grafts, in place of the desired growth of the thin fibrous lining or layer produced by good tissue ingrowth, there may be excessive tissue build up with gross complications, as calcification and septum formation. Instead of being permanently viable, with no more degenerative changes than normal to the vascular tree, the inner capsule may become rough and irregular, with which there may be sloughing or loosening of the deposited fibrin, or fibrin accumulation may lead to lumen thrombosis or graft occlusion.

Under this invention the potential for these serious consequences is eliminated or at least minimized by the provision of a compound vascular prosthetic graft, the same characterized novelly by a biological healing characteristic greatly superior to that which has heretofore been obtainable, and arising from a unique capacity to transform upon implantation from a blood-containing initial porosity to a fibroplastic permeating terminal porosity.

More particularly under this invention there are provided prostheses or devices for surgical implantation in human and animal bodies which initially, at the time of implantation, have a relatively low porosity but which have the capacity to undergo very great increase in porosity, in the implanted status.

Considering more particularly the differing initial and terminal porosites required of the ideal graft and by which the grafts of this invention are novelly characterized, the tubular implants hereof are fabricated ideally with an initial porosity of from zero (0) to about fifty (50) on the Wesolowski scale, porosites to the limit of fifty having been found safe without preclotting to use even with heparinized patients. It will be understood that higher initial porosites may be employed without hemorrhaging, these going preferably up to not more than about 200, but possibly up to as high as about 500, on the Wesolowski scale, with preclotting before use by immersing in the host or matched donor blood for a brief period.

The compound implants of the invention are further characterized by a terminal porosity, as found by the Wesolowski measurement following entire resorbtion of the animal derivative component, of at least about 5,000, or at least 100 times the ideal initial porosity of not more than about 50, and at least 25 times the preferred initial porosity of not more than about 200, on the Wesolowski scale. Under the invention this terminal porosity may be upwardly of said 5,000 and preferably from about 10,000 up to ideal long term values on the order of 20,000 or more, or to at least about 400 times the ideal initial porosity of 50 or less.

The fabricating of the implant for much higher terminal or long term porosities ranging upwardly to 20,000 and more is found under the invention to afford the graft desired healing qualities, with elimination or control of calcification and septum formation as above-mentioned. That is, it has been found under the invention that increasing the long term porosity of the graft to 20,000 or more on the Wesolowski scale provides maximum tissue intergrowth through the fabric interstices.

This described tailoring of the initial and terminal component graft porosity characteristics to the widely divergent implantation and long term requirements, as novelly achieved under this invention, is to be contrasted with the inherent limitation of the simple or all-synthetic implant of the prior art to the same initial-terminal porosity. Thus an all-synthetic graft could not be fabricated with a tightness of mesh approaching zero (0) porosity, and at the same time possess healing qualities. Moreover and conversely, with a biologically preferred porosity of 4,000–5,000, which is about the upper limit for the all-synthetic grafts, excessive hemorrhaging would occur or implantation, except only as the 4,000–5,000 porosity may be very substantially reduced by preclotting.

As above indicated, the transformation of the graft of this invention from an initial low implantation porosity to a terminal high biological healing porosity is accomplished under biological action wherein an organic component of the material of the device is absorbed and replaced by tissue and cellular growth upon and through the fabric, or wall of the device. Such biological modification and the capacity of the animal-derivative component of the fabric to be so dissolved and replaced is generally herein referred to as "resorption" and "resorbability," the material having the property of being so biologically digested and replaced by the endothelial and associated tissue and celluloar substances being referred to as "resorbable."

The invention accordingly incorporates in some or all of the implant fabric yarns one or more component strands formed of a resorbable material as produced from animal protein substances, for example collagen and collagenous matter native in the hide, skin, fascia, muscles and such connective tissues of vertebrates. Collagen will be understood to be separable and reducible to a collagen solution extrudable through small orifices and coagulable in similar fashion as employed in the formation of synthetic textile filaments. In the regenerated or reconstituted form the collagen or collagenous material may be variously processed as known in the manufacture of synthetic textile strands and yarns whether of spun, twisted or otherwise combined multifilament form in which the individual filaments may be more or less coalesced or coherent, or the product may comprise single continuous strands of the collagenous substance.

Examples of collagen strands of the character as here concerned are as disclosed in U.S. Patent No. 2,637,321 to Cresswell and Patent No. 2,748,774 to Novak, and as described in the article, "Collagen," by Jerome Gross, Scientific American, volume 204, No. 5, at page 120. Other collagen strands found especially suitable for the fabricating of implant devices of the present invention are those as disclosed in or made under the processes of U.S. Patent No. 2,747,228 to E. Braun et al, the same being commercially available in lengths up to 300 meters or more. Other animal protein substances which may be mentioned include catgut and collafil. It will be appreciated further than there might also be employed for the resorbable element human fibrinogen which is ideal in that it would be immediately resorbed. The human fibrin should therefore be understood as included within the terms animal derivative and animal protein as herein used.

The resorbable animal-derivative-substance strands herein concerned, then, may be composed of collagen or collagen derivative substance and more generally of such naturally occurring or synthetically produced animal derivative substance as is or may be found suited to the purpose. And the term "animal derivative" with respect to certain strands of the compound fabrics as here concerned will be understood as intending those of any known or preferred substance having the capacity for biological resorption in prosthetic use by dissolution and replacement by body tissues and cells, and including collagen and the other animal derivative protein substances as above mentioned, and including also the use of a wholly artificially created or "synthetic" strand having capacity for biological resorption when included in an implanted prosthetic device, should such "synthetic" strand become available. Thus whereas the term "animal derivative" is herein intended to indicate the chemical and physical properties of the strand material which give it the capacity to be biologically resorbed when present in a prosthetic implant, the term "synthetic" as herein used generically for the non-absorbable strands or yarns is not intended to imply that said other and resorbable strands or yarns may not at some time be synthetically produced.

The collagen strands here concerned and as commercially available in long continuous filament lengths up to as much as 300 m. or more (as contrasted with maximum lengths of but about 120 in. for surgical sutures of the absorbable or "gut" type) are presently identified as to diameter size by the like numbering scale as used for such sutures, running from size 7/0 (seven zeros) for the smallest (0.001 to 0.002 in.) through size 6/0, 5/0 (0.004 to 0.006 in.), 4/0, etc. by increments of 0.002 to 0.004 in. to 1/0 and then sizes 1, 2, 3, etc. up to 7 (0.036 to 0.040 in.); see U.S. Pharmacopeia, 14th Revision (U.S.P. XIV), page 598.

The synthetic yarns or strands herein employed are of non-absorbable composition as heretofore used for prosthetic implants, selected as having the properties of good compatibility with human tissue along with adequate strength, flexibility and resilience, such as the various synthetic fibre materials as referred to in my Patent No. 2,978,787. These may include synthetic and desirably multifilament yarns of the long-chain polyamide type of the nylon class, those of the tetrafluoroethylene type known in the trade as Teflon, also the type commercially designated as Orlon, and particularly those of the terephthalic acid-ethylene glycol ester variety as commercially produced by Du Pont de Nemours Co. under the trademark Dacron; also from the propylene group of the olefins or ethylene series a type of synthetic fibre known in that industry as polypropylene. For specific example, there may be employed a 34-filament Dacron yarn of 70 denier as available under the commercial designation Du Pont Type 5600. Thus when for identification the non-absorbable strands are herein referred to generally by the term "synthetic," there is intended thereby the class of artificial or synthesized textile fibres and filaments such as nylon, Orlon, Teflon, Dacron and polypropylene.

In accordance with the invention the composite yarns of the compound grafts, which comprise at least one synthetic and at least one animal derivative strand, may be run together in any manner, being wound or unwound, twisted or untwisted, in the yarn forming. Again, the synthetic or structure providing strands and the animal derivative or absorbable strands may be untwisted, or twisted, or they may be core-twisted, with one thrown or spiral-wrapped about the other, in their combining into the composite yarns from which are fabricated the compound grafts of the invention. And the synthetic and animal strands may each in turn be of any suitable monofilament or multifilament or single or plural construction.

Further in accordance with the invention, the yarns as just described are for the constructing of the compound grafts interlaced or meshed by extruding or knitting, or braiding, or weaving, or fabricating in any manner affording the desired porous, flexible wall and leaving to the permanent or non-absorbable component of the graft the needed stability and resistance to shifting of the residual synthetic fibers. And the yarns may thus be fabricated into various implant devices such as straight tubes and bifurcations, or which are of whatever form as may be suited to the replacement or correction of defects in cardiovascular tissue.

For purposes of illustration one example or embodiment of the compound surgical implant or prosthetic graft of the invention is shown in FIG. 1 as a straight tube 10, the same composed of a tubularly woven circumferentially continuous fabric which may be produced under any preferred weaving method of the several available for the purpose. In this tubular construction and in the other woven fabrications the walls of the devices will be understood as composed of warp elements or "ends" with which filling elements or picks are interwoven transversely.

The fabricating of a tubular implant of the invention by weaving it in accordance with a particular weaving mode is diagrammatically illustrated in FIG. 2. For this purpose there is employed a conventional multiple harness loom having at least four harness frames so arranged and controlled that two separate sheds of warps 11 respectively for webs or fabric plies $a$ and $a'$, FIG. 2, may be successively formed, the shuttle making alternate passes through each of them, as in weaving pillow cases and other elongate tubular products. In such weaving practice it is understood that one shed of the warps, for example, either for the web or ply $a$ or the web or ply $a'$ of FIG. 2, contains one more warp end than in the other shed, so that but a single warp end is included between successive crossings of the filling 12 from one shed to the other during the weaving.

The tubular implants of the invention may also be produced in a similar manner as for weaving ribbons and other narrow fabrics wherein dual-ply tubular shapes are woven having the axes of such tubes extending warpwise of the broad web and being laterally spaced weftwise, in the direction of the filling, by portions of angle ply fabric as for example in the general manner disclosed in the patent to Goldsmith No. 2,250,261. Such weaving method while satisfactory for relatively small diameters of tubular implants is less desirable for the larger sizes due to possible insufficient closure along the longitudinal cut edges of the tubular articles in the absence of special treatment or added material at such locations with resultant undesirable thickening of the tubing.

In FIG. 3 there is represented partly diagrammatically and on an enlarged scale a short piece of a continuous-length composite collagen and synthetic yarn indicated as a whole at 13. It comprises a core strand 14 of collagen or collagen derivative substance as earlier described, produced by extrusion from a solution in continuous lengths up to several hundred yards as may be desired, such as the commercially available continuous filament strands or elements earlier referred to and exemplified in the patents mentioned, in this representative instance being processed as in said U.S. Patent 2,747,228. About such core 14 there is spirally wrapped a non-absorbable synthetic strand 15 such as previously mentioned, preferably of continuous multifilament structure, forming a more or less open wrap or serving upon said core 14.

For prosthetic uses such non-absorbable element in disposed on the collagen core as a wrap or serving sufficiently open to leave adequate access to the core for invasion by fibroblasts, endothelial cells and tissues of the body. Depending on the number and size of collagen strands in the particular woven fabric or implant device the pitch or spacing between turns of the non-absorbable wrap may be varied in a range from about 3 to 8 or more turns per inch. In practice I have found that a wind of about 5 turns per inch is generally appropriate for a relatively fine collagen core of size No. 5/0 as earlier mentioned, and with a somewhat steeper pitch for larger cores. Thus by way of example I have employed composite yarns having core strands of No. 5/0 pure collagen served with an open wrap of 30 denier Dacron. I have also employed for the composite yarn a Dacron strand of 70 denier; and for particular example in the yarns here concerned there may be run together with the 70 denier Dacron yarn as abovementioned a collagen strand processed as under said Braun et al. Patent No. 2,747,228 of size No. 5/0.

It will be understood that the composite or synthetic and composite yarns may under the invention be interlaced in any desired manner capable of producing a flexible porous or mesh structure, and that the graft of FIG. 1 may comprise a tubular woven fabric such as represented in FIG. 4 and indicated generally there at 16, or at ubular knit fabric such as represented in FIG. 5 and indicated generally there at 17, or it may be otherwise constructed or fabricated.

Referring now again to the porosity aspect, it has been pointed out that under this invention grafts may have healing properties and still be fabricated to an ideal initial porosity of 50 or less. And whereas with the simple grafts of the prior art the upper limit of terminal porosity, without excessive hemorrhaging, is a 4,000–5,000 range which can be approached only with the use of preclotting and fine yarns, the terminal porosities contemplated by this invention are from 5,000 upwardly without limit, within which range it is found that such complications as calcification, septum formation and inner capsular slough are greatly minimized if not eliminated. Investigations have shown more particularly that the long term or biological porosity should be above 10,000 Wesolowski, or at least 200 times the ideal upper limit initial porosity of 50, on the Wesolowski scale.

Ultimate or terminal porosity for the fabrics as here concerned is determinable by chemically dissolving out the collagen content of the fabric, or the implant formed thereof, in an appropriate acetic or other acid bath. Such total chemical removal of the collagen content takes place at a faster rate than under biochemical action in an animal or human body and is not attended with simultaneous replacement by fibroblasts and other tissue growth as occurs in actual use as a surgical implant. Therefore the terminal porosity values as measured following such chemical treatment substantially exceed the actual porosity change as occurs in prosthetic use in vivos, thereby affording a large margin of safety.

It has been pointed out also that too slow a rate of absorbtion of the resorbable component contributes to excessive tissue growth as does the foreign body reaction to the synthetic component. Thus the invention further contemplates the use of as rapidly digested absorbable component as is available and meets the stated requirements of graft material, and with that the minimum proportion of synthetic component that will afford a residual fabric that resists tearing and possess the strength to contain blood pressure pulses; it being found that delayed resorbtion of the animal component, as well as the foreign body reaction to the synthetic component, contributes to the cyclical degeneration and reorganization or thickening of the inner capsule, with such possible consequence as calcification and septum formation, as hereinbefore mentioned.

The rate of reorganization is related also to the size of the mesh interstices; larger interstices permit more rapid reorganization of a degenerate inner capsule, and decrease in calcification. Accordingly, the invention grafts are fabricated with the finest gossamer synthetic structure that will support pulsations without bursting. The graft fabrication hereunder is also to provide even distribution or a regular pattern of the compound yarns, whereby the proper interstices are had with the least amount of synthetic; or, to put it another way, for the same proportion of synthetic, the maximum porosity is achieved.

An irregular pattern of the resorbable component will be understood also to produce some unacceptably large residual interstices, and instability and shifting of the residual synthetic fibers.

It has been pointed out also that under the invention the grafts may be fabricated by extruding, knitting, weaving, braiding, hand-sewing, or other mode of fabricating a perforate tube as here concerned. The grafts may as earlier mentioned be woven on a narrow loom, with up to 50 needles per inch, with warp threads of synthetic, as Dacron, in the long axis direction, and with the compound filling threads running circumferentially of the tubular structure.

It will be understood also that the preferred construction includes synthetic warp yarns and requires compound filling yarns. The longitudinal orientation of the synthetic threads will prevent delayed fraying or ravelling close to the lines of anastomosis or suturing.

Fabrication by knitting of the grafts with the closeness of mesh here concerned will be understood to produce a structure resembling a jersey fabric. The grafts may be knitted as a composite with the yarns previously combined or brought together at the knitting point from two carriers. Also, the yarn strands need not be combined previously, but may be united in the course of the fabricating.

The fabricating in anywise of the invention grafts may be with monofilament or multifilament strands and yarns. The lower deniers of the Dacron and other polyester synthetics are of course preferred, and the fine filament yarns are found to produce the desired thin walled material.

The dashed line of FIG. 6 illustrates the upper limit of the long term porosity that may be achieved with the prior or simple grafts, and the solid line represents the far higher biological porosities at which various fabrications of the compound graft hereof have been tested. These fabrications have employed a resorbable core-polyester wrap-around compound filling yarn such as hereinbefore described, and after chemical digestion are seen to have biological porosities ranging from nearly 10,000 to about 20,000. The exemplary fabrications whose digested porosities are graphed in FIG. 6 thus illustrate that the grafts of this invention have over the long term fibroblastic permeabilities and a biological healing property not heretofore attainable, and whereby absorbable strands of the graft structure are replaced by invading organic growths in the form of endothelial cells and fibroblasts in the host patient sufficient for the tissue of the host body to become adequately attached to the prosthetic implant, and whereby the desired thin-walled, viable graft lining or inner capsule is uniformly and rapidly grown and without complication.

It will be understood that following their fabricating the invention devices for use as vascular and other prosthetic implants are suitably finished to present them in normally open flexible tubular and self-supporting form such as in my mentioned Patent No. 2,978,787 and in my copending application Serial No. 775,522. Following separation into the tubular implant units, such as that of FIG. 1, these latter are washed in a detergent bath such as of Dreft, given preferably a triple rinse and then subjected to a lukewarm bath placing them in a moistened condition for crimping under installation upon mandrels, desirably with a micro-crimping formation as more fully disclosed in said application. On such mandrels the devices are subjected to oven drying wherein dehydration and sterilization are effected gradually as through a number of successive approximate 15-minute treating intervals starting for example at temperatures of 150° F. for the first two such intervals with successive temperature increases of 10° until a temperature of 212° is reached, which latter is held for a longer period such as one hour, thereby effecting a substantially bone-dry status for the implant devices. Thereafter the circumferential crimp formation may be set by further raising the temperature to the micro-crimping condition, followed by air-cooling on the carrier mandrels to the final self-supporting but longitudinal highly supple form.

From the foregoing it will be apparent that the invention comprises mesh wall devices fabricated for use as prostheses including particularly tubular forms thereof, in which devices are interlaced composite yarns comprised of synthetic strands run together with strands of a hemostatic but absorbable or resorbable nature and wherein the devices initially have a sufficiently closed mesh structure to avoid loss of blood therethrough when the prostheses are first inserted but are transformable in use, by reason of the resoprtion capacity of such latter strands, to the many times higher long term or terminal permeability or porosity required for, and whereby the invention grafts uniquely possess, the desired biological healing property.

I claim:

1. A vascular prosthetic implant for surgical use in the repair and replacement of vessels and tracts in human and animal bodies, said implant comprising a porous flexible tubular unit of compound fabric construction characterized by a relatively low porosity initially at the time of implantation and also by the capacity to increase in porosity in the implanted status under biological action wherein an organic component of the fabric is systematically resorbed and in that dissolved and replaced by living tissue and cellular growth between and through the fabric, said compound fabric implant formed of interlaced yarns fabricated in a mesh structure sufficiently closed to be substantially impermeable to blood when the prosthesis is first implanted, the initial porosity of said mesh structure ranging from zero through an ideal value of about 50 up to not more than about 500 on the Wesolowski scale, said compound fabric mesh structure fabricated at least in part uniformly distributed composite yarns comprising strands of a non-absorbable synthetic substance of adequate strength, flexibility and resilience and characterized by the properties of compatibility with and relative inertness to change in the presence of living tissue, of wettability to blood, and of capacity for sterilization, and said composite yarns further comprising strands of an animal derivative substance sufficiently hemostatic to prevent blood leakage during an initial implantation of the prosthesis but having the capacity for biological absorption in prosthetic use, said synthetic substance strands affording a stable structural framework for said porous flexible tubular implant, and said animal derivative substance strands affording the implant a controlled permeability characteristic whereby upon said biological absorption of said latter strands the porosity of said fabric increases to a terminal value of at least about 5,000 and preferably ranging from about 10,000 to 20,000 and upwardly, on the Wesolowski scale, and whereby said strands are replaced by invading organic growths in the form of endothelial cells and fibroblasts in the host patient sufficient for the tissue of the host body to become adequately attached to the prosthetic implant.

2. A vascular prosthetic implant according to claim 1, wherein said composite yarns comprise strands of an animal derivative substance consisting of collagen.

3. A vascular prosthetic implant according to claim 1, wherein said porous flexible tubular unit is of woven construction and wherein said composite yarns extend circumferentially of the tubular implant.

4. A vascular prosthetic implant according to claim 1, wherein said animal derivative strands of said composite yarns are uniformly distributed throughout the flexible tubular unit, and wherein said unit is constructed further with a synthetic component in the minimum amount that upon resorbtion of said organic component will afford a stable structure to the implant and contain the pulsations of the blood.

5. A vascular prosthetic implant according to claim 1, wherein said composite yarns comprise an absorbable core strand of animal derivative substance and a non-absorbable strand of synthetic substance spirally wound on said core strand.

6. A vascular prosthetic implant according to claim 1, wherein the fabric mesh structure has a preferred initial porosity of not more than about 200 and wherein the prosthesis is prepared without preclotting.

7. A vascular prosthetic implant according to claim 1, wherein the fabric mesh structure has an ideal initial porosity of not more than about 50, on the Wesolowski scale, and an ideal terminal porosity of not less than about 20,000, being at least 400 times said ideal initial porosity.

8. A vascular prosthetic implant according to claim 1, wherein the fabric mesh structure has an initial porosity ranging from zero to preferably not more than about 200 on the Wesolowski scale, and a terminal porosity ranging from 5,000 to 20,000 and upwards, being from 25 to 100 and more times said initial porosity.

9. A vascular prosthetic implant according to claim 1, wherein said animal derivative strands of said composite yarns are uniformly distributed throughout the flexible tubular unit, and wherein said unit further has a synthetic component arrangement and proportion providing minimum foreign body reaction and maximum residual porosity with retention of a stable mesh structure that will resist tearing and contain the pressure pulses of the blood.

References Cited by the Examiner

UNITED STATES PATENTS

| | | | |
|---|---|---|---|
| 2,072,302 | 3/1937 | Hermann et al. | 128—335.5 |
| 2,637,321 | 5/1952 | Cresswell | 128—335.5 |
| 2,731,788 | 1/1956 | Donaldson | 28—76 |
| 2,827,359 | 3/1958 | Kine et al. | |
| 2,978,787 | 4/1961 | Liebig | 28—73 |
| 2,985,056 | 5/1961 | Greve | 57—140 |

OTHER REFERENCES

Wesolowski et al.: "Porosity: Primary Determinant of Ultimate Fate of Synthetic Vascular Grafts," Surgery, volume 50, 1961, pp. 91–96.

RICHARD A. GAUDET, *Primary Examiner.*

DALTON L. TRULUCK, *Examiner.*